US006680019B1

(12) United States Patent
Crassous

(10) Patent No.: US 6,680,019 B1
(45) Date of Patent: Jan. 20, 2004

(54) PREFABRICATED PLANKING BY GLUING WITH STRAIGHT OR CURVED BOARDS AND HAVING A PLANAR OR COMPLEX SHAPE

(75) Inventor: Dominique Crassous, Montpellier (FR)

(73) Assignee: Techmar Industries Ltd., Tortola (VG)

( * ) Notice: Subject to any disclaimer, the term of this patent is extended or adjusted under 35 U.S.C. 154(b) by 0 days.

(21) Appl. No.: 09/700,799

(22) PCT Filed: May 7, 1999

(86) PCT No.: PCT/FR99/01084

§ 371 (c)(1),
(2), (4) Date: Nov. 20, 2000

(87) PCT Pub. No.: WO99/59782

PCT Pub. Date: Nov. 25, 1999

(30) Foreign Application Priority Data

May 19, 1998 (FR) .......................................... 98 06489

(51) Int. Cl.[7] .............................................. B29C 53/02
(52) U.S. Cl. ....................... 264/261; 264/277; 264/295
(58) Field of Search ................................ 264/510, 261, 264/277, 295

(56) References Cited

U.S. PATENT DOCUMENTS 4,351,256 A 9/1982 Jonsson

FOREIGN PATENT DOCUMENTS

| | | |
|---|---|---|
| AU | 578 276 | 10/1988 |
| GB | 745021 | 2/1956 |
| GB | 1112843 | 5/1968 |
| GB | 2 304 646 | 3/1997 |

*Primary Examiner*—Edmund H. Lee
(74) *Attorney, Agent, or Firm*—Young & Thompson

(57) ABSTRACT

A planking technique for producing, in a workshop, floors of required length with straight or curved boards having planar or curved shape. The technique restricts the period for which the object is immobilized to the time during which the prefabricated panels are being glued. The technique is particularly adapted for producing the skirts of swimming pools, boat decks, saunas, thalassotherapy installations and, more particularly, floors with complex shapes. A template is produced based on the surface to be covered in a material which will be subsequently eliminated. The boards are glued with their upper surface on the template lower surface with edge bending corresponding to the bending desired for the final production. The sealant between the boards can be produced at this stage of manufacture.

1 Claim, 1 Drawing Sheet

PREFABRICATED PLANKING BY GLUING WITH STRAIGHT OR CURVED BOARDS AND HAVING A PLANAR OR COMPLEX SHAPE

BACKGROUND OF THE INVENTION

The invention concerns a planking technique for producing, in a workshop, floors of required length with straight or curved boards having planar or curved shape, (such as ship's decks, pool access, etc . . . ) the lay out is achieved through any convenient technique not requiring a long period for which the object is immobilized.

Traditionally, planks are glued one by one on the area to cover and other pre-build process don't allow the wood to meet the pre set outline.

SUMMARY OF THE INVENTION

The process described herein permits, after determinating the shape of the planking and the curve of the boards, building the planking by gluing so that the planking can be supplied ready to stick.

DESCRIPTION OF THE PREFERRED EMBODIMENTS

A template whose size is identical to that of the developed area is produced using materials like thin pasteboard.

Thanks to the suitable further described tools, the wooden blades and potential junction, which can be a kind of rubber wire, are associated the upper face of the boards on the lower face of the template, using rapid glue. Ending this step is provided a sub-system where the template sticked area will be the upper floor access when the lay-out is completed. The assembly is stickable, as prepared, on any structure. The template will be eliminated by planing, sanding or any convenient means like a solvent of the glue that maintains the template. Therefore, the such supplied assembly can be incorporated into a vacuum stratified moulding, for example ship decks, sauna bench or polyester swimming pool.

Very thin floors can be obtained even with curved boards.

The boards are glued on the template having sufficient thickness to obtain a regular curve without warping or planing to obtain thin floors. Since the boards are stuck to each other, they can't distort, thanks to the template's stiffness.

Such an assembly can be vacuum glued on any support which operates either as a structural floor or as an intermediate composite to supply a shaped and ready-to-use product.

Thanks to a mould incorporated into the vacuum sandwich the planking can be pre-shaped.

After this step, the template is eliminated.

The major necessary tooling incorporates all the tools needed to operate a vacuum gluing and a table with parallel rails on top of it so that the template is laid down under the rails before boards are displayed and glued.

On the rails are put:

1) a movable abutment to enable securing the template and the boards where will be applied the pressure.

2) mobile pressure control wedges, as many on every rail as are the boards to be pressed.

The rails are cross displayed to the boards axis within the necessary amount to obtain the homogeneous boards curvature together with a minimized bucking.

The building process is illustrated by the drawings.

Figure 1:
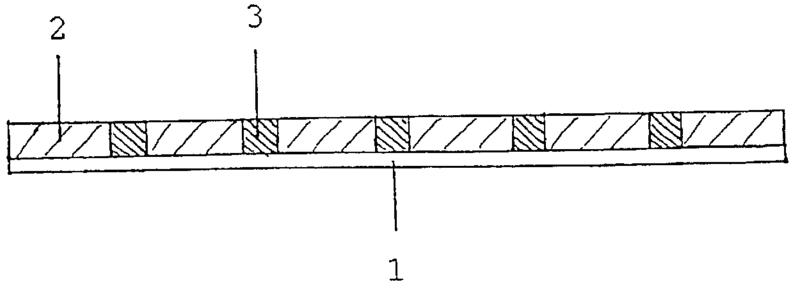
FIG. 1 shows a cross-section of the primary gluing results.

FIG. 1 shows a cross section of the primary gluing results.

Here are seen the wooden boards (2), the sealant (3) between the boards, and the template (1) used to obtain the planar assembly.

Figure 2:
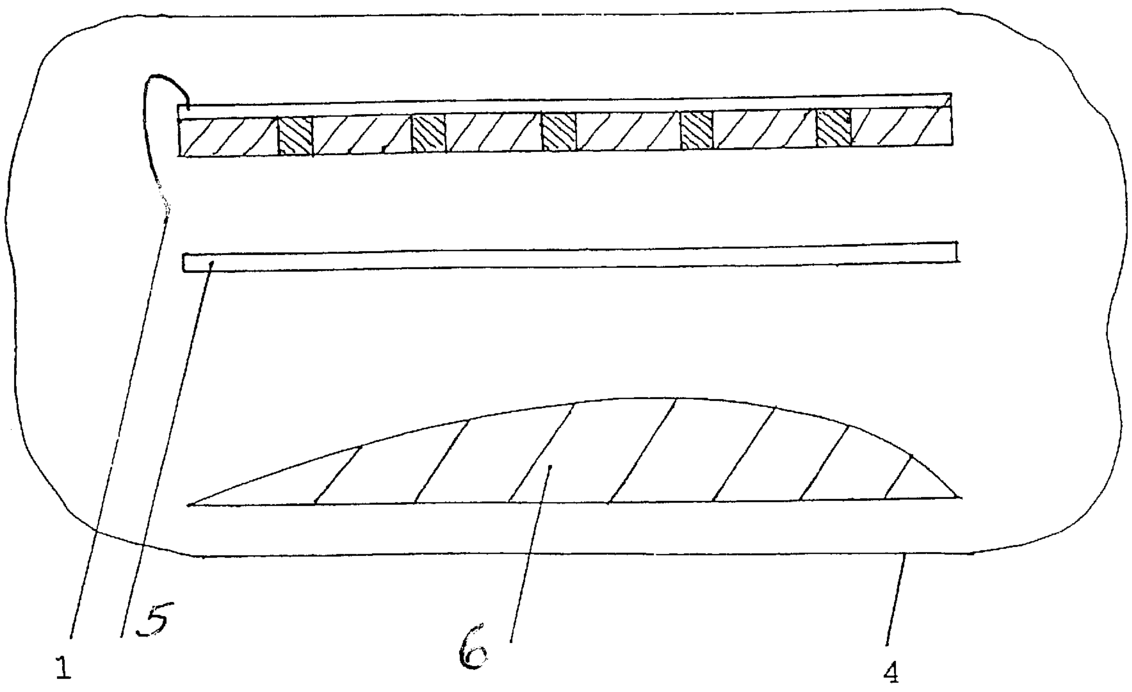
FIG. 2 shows a cross-section of the shaping principle of the present invention.

FIG. 2 shows on a cross section the fulfilment shaping principle from the planar result represented on drawing 1.

As seen therein, the unit may include the intermediate plate (5), the mould (6) and the flexible bag due (4) in which vacuum gluing is enabled.

1) fixing the boards (2) spaced apart on a template (1) whose size is identical to the surface to be covered;

2) filling spaces between the fixed boards with a polymerizable liquid sealant (3), wherein the sealant flows into the spaces by gravity;

3) inverting the assembly of template, boards and sealant;

4) polymerizing the sealant (3) of the inverted assembly;

5) before complete polymerization of the liquid sealant, putting the inverted assembly on a mold (6) corresponding to a final defined shape of the surface to be covered;

6) applying pressure to the inverted assembly on the mold (6) to give the assembly the final defined shaped; and 7) eliminating the template (1) from the inverted assembly after complete polymerization.

I claim:

1. A process for building prefabricated planking for a surface to be covered, comprising the steps of:

fixing boards spaced apart on a template whose size is identical to the surface to be covered;

filling spaces between the fixed boards with a polymerizable liquid sealant, wherein the sealant flows into the spaces by gravity;

inverting the assembly of template, boards and sealant;

polymerizing the sealant of the inverted assembly;

before complete polymerization of the liquid sealant, putting the inverted assembly on a mold corresponding to a final defined shape of the surface to be covered;

applying pressure to the inverted assembly on the mold to give the assembly the final defined shaped; and eliminating the template from the inverted assembly after complete polymerizations.

* * * * *